March 19, 1929.  W. A. THUM  1,706,265
RACING APPARATUS
Filed Nov. 29, 1926   3 Sheets-Sheet 1

INVENTOR
Walter A. Thum.
BY Bakewell & Chuck
ATTORNEYS

March 19, 1929. W. A. THUM 1,706,265
RACING APPARATUS
Filed Nov. 29, 1926 3 Sheets-Sheet 2
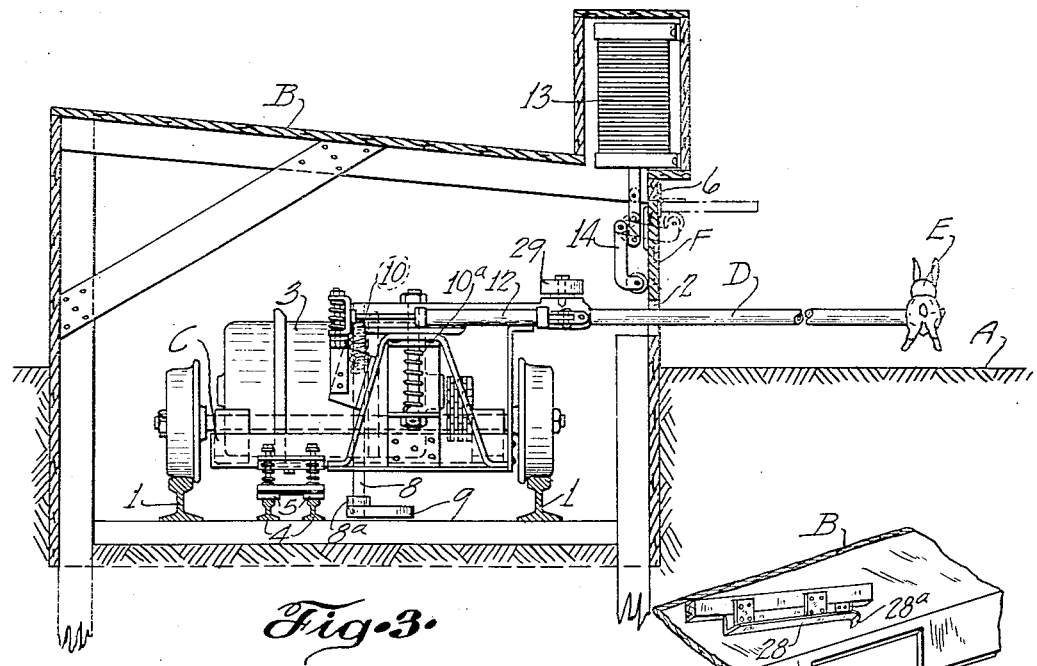
Fig. 3.
Fig. 4.  Fig. 4.ᵃ
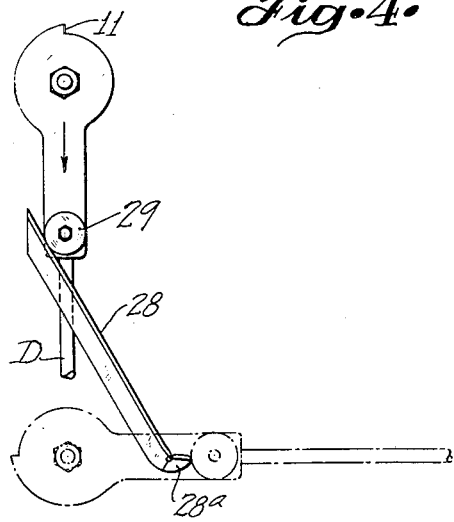
Fig. 5.
INVENTOR
Walter A. Thum.
BY
Bakewell & Church
ATTORNEYS March 19, 1929.　　W. A. THUM　　1,706,265
RACING APPARATUS
Filed Nov. 29, 1926　　3 Sheets-Sheet 3
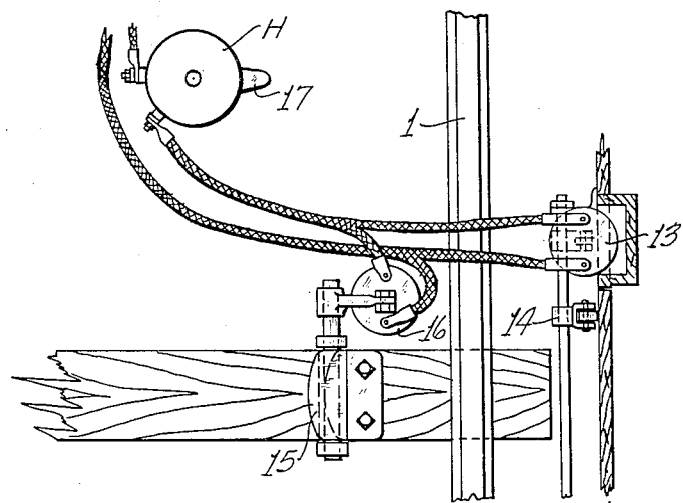
Fig. 6.
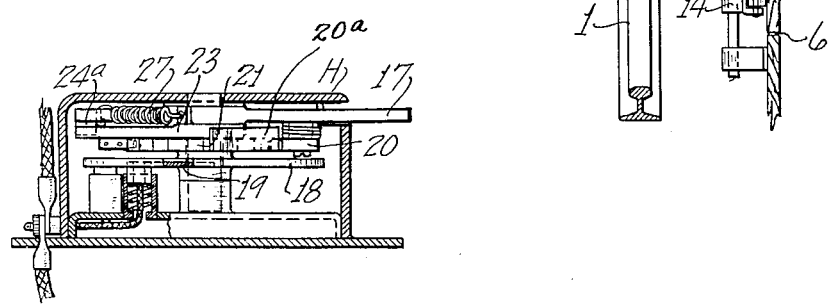
Fig. 7.
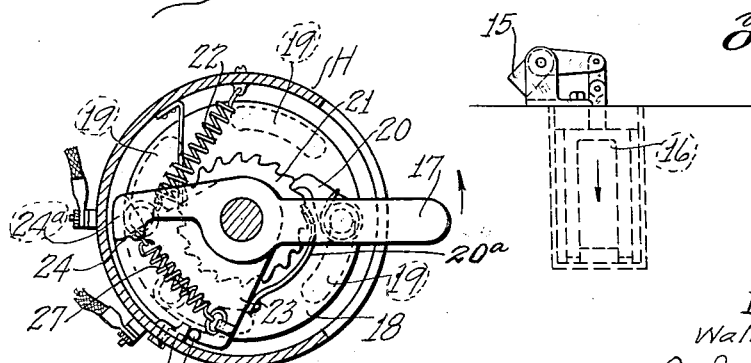
Fig. 8.
Fig. 7a.
INVENTOR
Walter A. Thum.
BY Bakewell & Church
ATTORNEYS Patented Mar. 19, 1929.

1,706,265

UNITED STATES PATENT OFFICE.

WALTER A. THUM, OF ST. LOUIS, MISSOURI, ASSIGNOR TO GEORGE W. HEINTZ, OF NEW ORLEANS, LOUISIANA.

RACING APPARATUS.

Application filed November 29, 1926. Serial No. 151,408.

This invention relates to apparatus of the kind that are used to induce animals, usually dogs, to race around a track.

The conventional dog racing apparatus that is now in general use consists of an endless track over which the dogs race, an electrically-operated car or conveyor that travels in a housing arranged adjacent said track, a laterally-projecting arm on said car that overhangs the track, and an imitation rabbit or other object mounted on said arm so as to serve as a lure which the dogs strive to catch when the car is moved around the track at a point in advance of the dogs. In order to create the impression of a chased animal running into its den or place of refuge, the housing in which the car travels is provided with an opening controlled by a door, and means is provided for moving the lure through said opening and then closing the door after the foremost dogs have passed the finish line. In prior racing apparatus of this general type the car that carries the lure is controlled both as to speed and direction of travel by an operator stationed in a tower located adjacent the track, and manually-operated devices under the control of a different operator are used to effect the withdrawal of the lure from the track and to thereafter close the door of the opening through which the lure escapes so as to prevent the dogs from following the lure into its den or place of refuge.

The main object of my invention is to provide a racing apparatus of the general type mentioned, which is of such construction that the services of a second operator are not required to manipulate or control devices which effect the removal of the lure from the track and the closing of the door that prevents the dogs from following the lure.

Another object is to provide a racing apparatus which is equipped with an automatically-operating mechanism for effecting the removal of the lure from the track and the subsequent closing of the door that co-operates with the opening through which the lure escapes from the track.

Another object is to provide a racing apparatus that is equipped with an electrically-operated tripping device and an electrically-operated controlling means for the door of the lure's den, both of which are governed or controlled by a switch that is operated by a part on the car that carries the lure.

And still another object of my invention is to provide a racing apparatus, which, in addition to having provision for automatically opening and closing the door of the opening through which the lure escapes from the track and for automatically setting and rendering inoperative the tripping device that effects the removal of the lure from the track, has provision for automatically moving the lure into operative position in the track prior to the starting of the race. Other objects and desirable features of my invention will be hereinafter pointed out.

Figure 1 of the drawings is a diagrammatic view, illustrating the track and the method of establishing electrical connection between the various elements or devices of the apparatus.

Figure 3 is a transverse sectional view through the car housing, showing the car in end elevation and illustrating the electrically-operated device that is used to open the door that closes the opening in the car housing through which the lure is removed from the track.

Figure 4 is a perspective view of a portion of the car housing, showing the opening in the side of said housing through which the lure moved onto the track and the means that is used to move the lure carrying arm in a direction to position the lure in the track.

Figure 1:
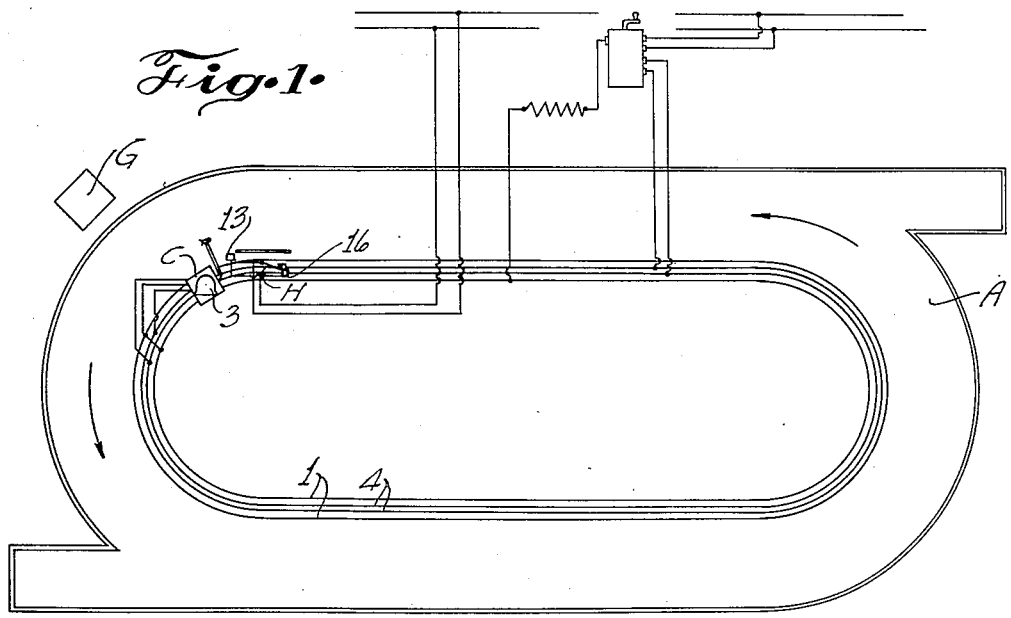

Figure 4ª is a sectional view, illustrating the lure carrying arm and the means that moves said arm into its operative position.

Figure 5 is a top plan view of said arm and means, showing the two different positions of said arm.

Figure 6 is an enlarged detail view, showing the electrically-operated controlling device for the door; the electrically-operated tripping device and the switch that governs both of said devices.

Figure 7 is an enlarged vertical sectional view of said switch.

Figure 7ª is a top plan view of said switch with the top portion of the switch housing removed; and Figure 8 is a side elevational view of the electrically-operated tripping device.

Referring to the drawings which illustrate the preferred form of my invention, A designates a track of any preferred shape and length, which, in most instances, will consist of a continuous track of either circular or oval shape, B designates a housing arranged adjacent said track, preferably at the inner side of same, C designates an electrically-operated car or conveyor in said housing that travels on rails 1, D designates an arm on the car C that projects laterally through a horizontally-disposed slot 2 in one side wall of the housing B and E designates a lure of any preferred type or kind mounted on the arm D, as shown in Figure 3. The car C is operated by an electric motor 3 to which electric current is supplied by a third rail 4, which co-operates with a shoe 5 carried by the car. Either A. C. or D. C. current may be used, and when the car is operated by A. C. current, it will be provided with two shoes that co-operate with two rails, as shown in Figure 3.

Figure 2:
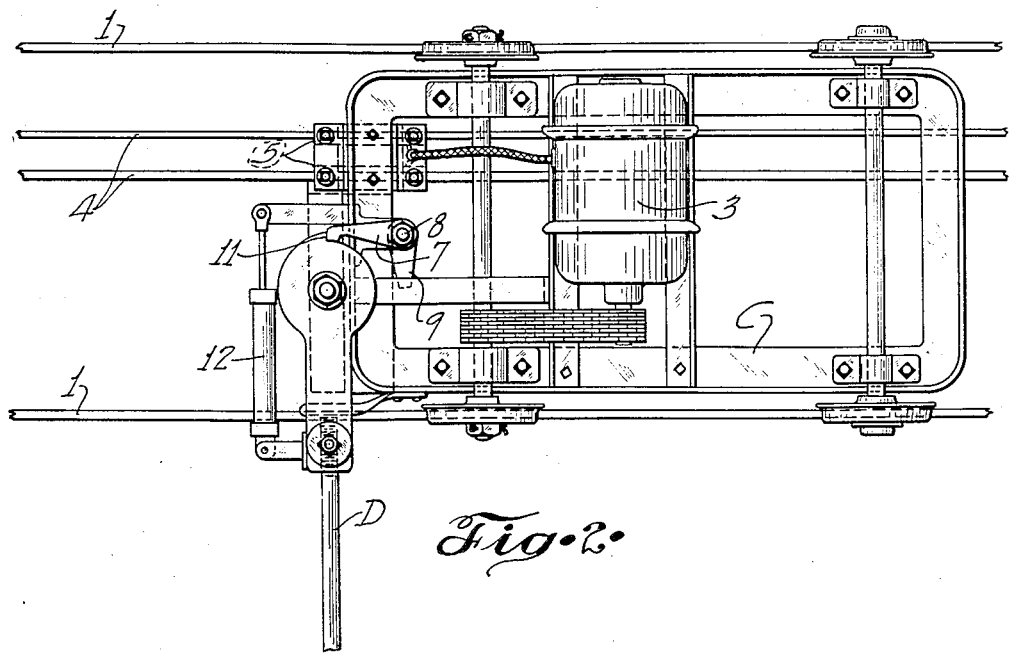
Figure 2 is a top plan view of the electrically-operated car or conveyor that carries the lure.

At a point in advance of the finish line of the track, i. e., the point where the winner of the race is determined, the slotted side wall of the housing B is provided with an opening 6 of sufficient size to permit the lure E to be moved off the track and into said housing, and the arm D which carries the lure is pivotally mounted on the car C in such a manner that it can be swung into an operative position, wherein it projects laterally from the car and overhangs the track A, or swung into an inoperative position, wherein it is located inside of the housing B and extends longitudinally of the car. A door F, preferably of the hinged type, is provided for closing the opening 6 in the side wall of the housing B, and a latch 7, shown in Figure 2, is provided for holding the lure carrying arm D in its operative position. The latch 7 is connected to the upper end of a vertically-disposed shaft 8 on the car C which is provided at its lower end with a trip operating lever 9, and torsion springs 10 and 10ª or other suitable operating devices are combined with the shaft 8 and with the lure carrying arm D, respectively, so as to swing said arm into the housing B, and thus withdraw the lure from the track when the latch 7 is tripped to disengage it from a shoulder or notch 11 in a part on the inner end of the lure carrying arm D. In order to absorb the shock or check the movement of the lure carrying arm D when said arm swings into its inoperative position inside of the housing B, a pneumatic shock absorber or air check 12 is combined with the arm D, as shown in Figure 2.

When the race is in progress the car C is moved around the track A at a point in advance of the dogs, which strive to catch the lure E mounted on the arm D, the speed and direction of travel of said car being governed by electrically-operated devices under the control of an operator stationed in a tower G located adjacent the track. At the termination of the race, or after the foremost dogs have passed the finish line, the lure E is withdrawn from the track and moved into the housing B through the door opening 6, so as to create the impression of a rabbit escaping into its den or place of refuge, and the door F is then moved into its closed position, so as to prevent the dogs from following the rabbit. These operations, i. e., the removal of the lure E from the track and the closing of the door F, are effected automatically by electrically-operated devices. Said electrically-operated devices can be constructed and arranged in various ways without departing from the spirit of my invention, but in the apparatus herein illustrated a solenoid or other suitable electrically-operated device 13 is combined with an operating mechanism 14 for the door F in such a manner that said door will be swung upwardly into its open position, as shown in broken lines in Figure 3 when said solenoid is energized and will be retained in its open position so long as electric current continues to flow through the solenoid. When the energizing circuit is opened or interrupted the door F will move downwardly into its closed position, as shown in full lines in Figure 3. The device that is used to effect the removal of the lure from the track consists of a rockably or pivotally mounted tripping device 15 that is arranged in the path of travel of the car at such a point with relation to the door opening 6 in the car housing, that it will cause the latch 7 on the car to be tripped when the car is approaching the door opening 6, thereby permitting the springs 10 and 10ª that are combined with the shaft 8 and lure carrying arm D to swing said arm into its inoperative position inside of the car housing. Said tripping device 15 is combined with a solenoid or other electrically-operated device 16, as shown in Figures 6 and 8, in such a way that closing of the circuit in which said solenoid 16 is arranged will cause the tripping device 15 to move into an operative position, wherein it will co-operate with the tripping lever 9 on the car to disengage the latch 7 from the arm D while the car is traveling past said tripping device. As soon as the energizing circuit is opened or interrupted, the tripping device 15 will move into its inoperative position, shown in Figure 8, out of the path of the tripping lever 9 on the car.

A switch H is used to govern the circuit in which the solenoids 13 and 16 are arranged, said switch being located in the path of travel of the car at a point a slight distance beyond the tripping device 15 and being provided with an operating member 17 which is adapted to be engaged and operated by a roller 8ª on the depending shaft 8 on the car C when the car travels past said switch. The movable element of the switch H, which opens and closes the circuit, is herein illustrated as consisting of a rotatable disk 18 provided with a plurality of segmental-shaped conducting members 19, each of which is adapted to co-operate with the two contacts of the circuit, and thus close the circuit when the member 18 is in a "closed" position, the solenoids 13 and 16 being connected in multiple with the circuit. The switch member 18 is adapted to be rotated forwardly with a step by step movement, and the conducting devices 19 on said member are so disposed that in one position of said member 18 the circuit will be closed, in the succeeding position of said member the circuit will be open, and in the next position of said member the circuit will be closed. Any suitable means can be used to obtain this alternate opening and closing of the circuit. In the switch H herein shown the operating member 17 of the switch is provided with a pivotally mounted pawl 20 that co-operates with a ratchet 21 secured to the switch member 18 so as to impart a forward step to the switch member 18 when the operating member 17 is moved forwardly in the direction indicated by the arrow in Figure 7a by engagement with the roller 8a on the car C. The operating member 17 is moved in the opposite direction so as to restore it to its starting position by means of a spring 22 attached to an oscillating plate 23 that is equipped with a shoulder 24 which co-operates with a similar shoulder or lug 24a that projects downwardly from one end of the operating member 17, as shown in Figures 7 and 7a. During the forward movement of the operating member 17 the spring 22 is placed in tension, and as soon as said operating member passes out of engagement with the shaft 8 on the car, the spring 22 will exert pressure on the oscillating plate 23 in a direction to cause said plate to swing the operating member 17 in the opposite direction, back to its starting position, the plate 23 being provided with a stop 25 that is normally held in engagement with a co-operating stop or lug 26 on the switch housing by the tension of the spring 22. The co-operating lug and shoulder 24a and 24 on the inner end of the operating member 17 and on the oscillating plate 23 are normally held in engagement with each other by a spring 27 which is attached at one end to the plate 23 and at its opposite end to the operating member 17, so that said plate and operating member move as a single unit when the member 17 is swung forwardly to impart a forward step to the switch member 18, during the forward travel of the car C. When the car C is moved rearwardly, however, as, for example, when said car is being returned to its starting point at the beginning of a race, the roller 8a on the shaft 8 on the car strikes against the outer end of the operating member 17 and swings said member in an opposite direction to that indicated by the arrow in Figure 7a, which movement of the operating member 17 has no effect on the movable element 18 of the switch, due to the fact that the pawl 20 will ride idly over a stationary guard 20a adjacent the ratchet 21 and the spring 27 will be placed under tension so that it will immediately restore the operating member 17 to its normal position after the roller 8a on the car passes out of engagement with the same. Accordingly, a switch of the construction shown in Figures 7 and 7a will impart a forward step to the controlling element 18 of the switch each time the car C travels forwardly past said switch, and when said car is moved rearwardly past said switch, the controlling element 18 will remain at rest and not cause any change in the condition of the circuit. When the apparatus is in use the forward movement of the car C past the switch H at the beginning of the race causes the controlling element 18 of the switch to move into its closed position, thereby closing the circuit, with the result that the door F is moved into its open position and the tripping device 15 is swung upwardly into its operative position. Assuming that the track A is of such length that the dogs make only one lap of the track for a race, after the car C has passed the finish line the tripping lever 9 on the shaft 8 on the car engages the tripping device 15, thereby tripping the latch 7 and permitting the arm D to move in a direction to withdraw the lure E from the track and move it into the housing B through the door opening 6 in the side wall of said housing, and immediately after the lure has passed through said opening, the roller 8a on the shaft 8 engages the operating member 17 of the switch H and moves said member in a direction to shift the controlling element 18 of the switch into its open position, whereupon the door F will be immediately restored to its closed position and prevent the dogs from following the lure into its den, the opening of the circuit also causing the tripping device 15 to be restored to its inoperative position. Thereafter, the operator in the controlling tower G manipulates the controlling devices which cause the car C to move rearwardly back to its starting position to be ready for the next race, and when the car approaches a different opening 6a in the side wall of the housing, an inclined member 28, which is attached to the roof of the housing, as shown in Figures 4, 4a and 5, engages a roller 29 on the lure carrying arm D and positively moves said arm in a direction to withdraw the lure from the housing and arrange it in its operative position over the track, the latch 7 on the car snapping into engagement with the shoulder or notch 11 in the lure carrying arm as soon as said arm reaches its operative position. In order that the inclined member 28 on the roof of the housing will not interfere with the forward movement of the car, said inclined member is provided at its end with a hinged extension 28a which is free to yield or give when the roller 29 on the lure carrying arm strikes against same during the forward travel of the car C.

From the foregoing it will be seen that only one operator, i. e., the operator stationed in the tower G, is required to control the operation of all the parts of the apparatus, the withdrawal of the lure from the track and the closing of the door F which prevents the dogs from following the lure into its den being effected by electrically-operated devices controlled by the switch H, which switch is of such construction that the forward movement of the car at the beginning of the race causes the door to be opened and the tripping device 15 to be set in its operative position, and the forward movement of the car at the termination of the race, past the tripping device 15 and switch H, causing the latch 7 to be tripped and the energizing circuit for the solenoids 13 and 16 to be opened. Said switch H is also constructed in such a way that the condition of the circuit will not be changed or disturbed when the car C is moved rearwardly back to the starting point, and during this operation of moving the car back to the starting point, the lure carrying arm D is moved outwardly into its operative position by means of the inclined member 28 on the roof of the car housing B.

Having thus described my invention, what I claim as new and desire to secure by Letters Patent is:

1. A racing apparatus of the type referred to, comprising a track, a car or conveyor, means for moving the car around the track at a point in advance of the animals competing in the race, a lure carried by said car, a housing, den or the like arranged adjacent the track and provided with an opening through which the lure is moved at the termination of the race, a closure for said opening, a device for moving the lure relatively to the car for effecting the removal of the lure from the track and moving the lure through said opening, and an electrically-operated mechanism for causing said closure to move into its closed position and for causing said device to operate at the termination of the race.

2. A racing apparatus of the type referred to, comprising a track, car or conveyor, means for moving the car around the track at a point in advance of the animals competing in the race, a lure carried by said car, a housing, den or the like arranged adjacent said track and provided with an opening through which the lure is moved at the termination of the race, a closure for said opening, a device for moving the lure relatively to the car for effecting the removal of the lure from the track and moving the lure through said opening, an electrically-operated element for controlling said closure, an electrically-operated element for rendering said device operative, and a switch arranged adjacent the path of travel of the car and adapted to be operated by a part on the car for governing the circuit that energizes said elements.

3. A racing apparatus of the type referred to, comprising a track, a car or conveyor, means for moving the car around the track at a point in advance of the animals competing in the race, a lure carried by said car, a housing, den or the like arranged adjacent the track and provided with an opening through which the lure is moved at the termination of the race, a closure for said opening, a device for moving the lure relatively to the car for effecting the removal of the lure from the track through said opening, a mechanism rendered operative by the movement of the car at the beginning of the race for causing said closure to open and for causing said device to be placed in an operative condition, and means for causing said device to move the lure through said opening when the car reaches said opening at the termination of the race and for causing said closure to immediately close after the lure has passed through said opening.

4. A racing apparatus of the type referred to, comprising a car or conveyor, means for moving said car around a track, a lure, a housing or den provided with an opening through which the lure is withdrawn from the track, an operating mechanism for moving the lure through said opening, a door for said opening, a tripping device in the path of travel of the car for actuating said lure operating mechanism, an electrically-operated mechanism for rendering said door operative and inoperative and for rendering said tripping device operative and inoperative, and co-operating elements arranged on the car and in the path of travel of the car for governing said mechanism.

5. A racing apparatus of the type referred to, comprising a car or conveyor, means for moving said car around a track, a lure, a housing or den provided with an opening through which the lure is withdrawn from the track, an operating mechanism for moving the lure through said opening, a door for said opening, a tripping device in the path of travel of the car for actuating said lure operating mechanism, an electrically-operated device for controlling said door, an electrically-operated door for controlling said tripping device, and a switch arranged adjacent the path of travel of the car and adapted to be operated by a part on the car for governing the circuit in which the electrically-operated devices are arranged.

6. A racing apparatus of the type referred to, comprising a car or conveyor, means for moving said car around a track, a lure, a housing or den provided with an opening through which the lure is withdrawn from the track, an operating mechanism for moving the lure through said opening, a door for said opening, a tripping device in the path of travel of the car for actuating said lure operating mechanism, an electrically-operated device for controlling said door, an electrically-operated device for controlling said tripping device, and a switch arranged adjacent the path of travel of the car and adapted to be operated by a part on the car for governing the circuit in which the electrically-operated devices are arranged, said switch being so constructed that the car can be moved rearwardly past said switch without causing said switch to change the condition of said circuit.

7. A racing apparatus of the type referred to, comprising a car or conveyor, means for moving said car around a track, a lure, an operating mechanism on said car for moving said lure into and out of operative position on the track, a means that is adapted to be set in a position to cause said operating mechanism to move the lure off of the track at a certain point in the path of travel of said car when it is moving in one direction, and an independent means for causing said operating mechanism to move the lure onto the track at a certain point in the path of travel of the car when it is moving in the opposite direction.

8. A racing apparatus of the type referred to, comprising a car or conveyor, means for moving said car around a track, a lure carried by the car and adapted to be positioned on or in the track when a race is in progress, an opening through which the lure is adapted to pass from the track at the termination of the race, a door for closing said opening, an automatically operating mechanism for effecting the removal of the lure from the track and moving the lure through said opening and for thereafter closing said door when the car is traveling in one direction, and an independent means for automatically restoring the lure to its operative position in the track when the car travels in the opposite direction.

9. A racing apparatus of the type mentioned, comprising a car or conveyor, means for moving said car around a track, an arm on said car projecting laterally over the track and provided with a lure, a means combined with said arm for actuating it so as to move the lure off of the track, a latch for holding said arm in its operative position, with the lure positioned on the track, a tripping device for said latch arranged in the path of travel of the car, and an electrically-operated means for rendering said tripping device operative and inoperative.

10. A racing apparatus of the type mentioned, comprising a car or conveyor, means for moving said car around a track, an arm on said car projecting laterally over the track and provided with a lure, a means combined with said arm for moving it in a direction to withdraw the lure from the track, a latch for holding said arm in its operative position with the lure positioned on the track, a tripping device arranged in the path of travel of said car for tripping said latch, an electrically-operated element for rendering said tripping device operative, and a controlling switch for said electrically-operated element arranged in the path of travel of the car and constructed so that a part on the car causes said switch to close the energizing circuit at some point intermediate the start and finish of the race.

11. A racing apparatus of the type mentioned, comprising a car or conveyor, means for moving said car around a track, a housing in which said car travels, an arm projecting laterally from said car through a slot in said housing and provided with a lure that is positioned on the track, an opening in said housing through which the lure passes into said housing when the arm moves into its inoperative position, a door for said opening, a means that tends to move said arm in a direction to hold said arm into its inoperative position with the lure positioned in the housing, a latch for holding said arm in its operative position, a tripping device for said latch arranged in the path of travel of said car, electrically-operated devices associated with said door and with said tripping device, a switch for controlling the circuit that energizes said devices arranged in the path of travel of the car and adapted to be operated by a part on the car, and means for absorbing the shock on the lure carrying arm when said arm moves in a direction to withdraw the lure from the track and move said lure into the housing.

12. A racing apparatus of the type mentioned, comprising a car or conveyor, means for moving said car around a track, a housing in which said car travels, an arm projecting laterally from said car through a slot in said housing and provided with a lure that is positioned on the track, an opening in said housing through which the lure is adapted to be moved by said arm into the housing, a door for said opening, a means that tends to move said arm into its inoperative position with the lure positioned in the housing, a latch for holding said arm in its operative position with the lure positioned on the track, a tripping device for said latch arranged in the path of travel of said car, electrically-operated devices associated with said door and with said tripping device, a switch for controlling the circuit that energizes said devices arranged in the path of travel of the car and adapted to be operated by a part on the car, means for absorbing the shock on the lure carrying arm when said arm moves in a direction to withdraw the lure from the track through the opening in said housing, and a means for moving the lure carrying arm into its operative position when the car is being moved rearwardly to its starting position, said switch being constructed so as to cause the tripping device to be set in its operative position and said door to be opened while the car is traveling towards the finish line of the track and to thereafter cause said door to be closed and said tripping device to be rendered inoperative at the termination of the race.

13. A racing apparatus of the type referred to, comprising a car or conveyor, means for moving said car around a track, a lure carried by said car and adapted to be positioned on or in the track when a race is in progress, a housing for said car provided with an exit opening through which the lure is adapted to pass at the termination of the race, an entrance opening in said housing through which the lure is moved into operative position on the track preparatory to the start of the race, a door for closing said exit opening, means for moving the lure into said housing through said exit opening, an automatically operating means for closing said door after the lure has passed through said exit opening into the housing, and means for automatically moving the lure through said entrance opening into operative position on the track.

14. A racing apparatus of the type referred to, comprising a car or conveyor, means for moving said car around a track, a movable arm on said car equipped with a lure, a housing for said car provided with an entrance opening through which the lure is moved into operative position on the track, and a part on said housing that is adapted to cooperate with said arm to cause the arm to operate automatically to move the lure through said entrance opening and into operative position on the track when said car travels in one direction.

WALTER A. THUM.